June 24, 1930.   W. C. TZINSKI   1,767,159
SHELTER COVER FOR RUMBLE SEATS
Filed Jan. 26, 1928
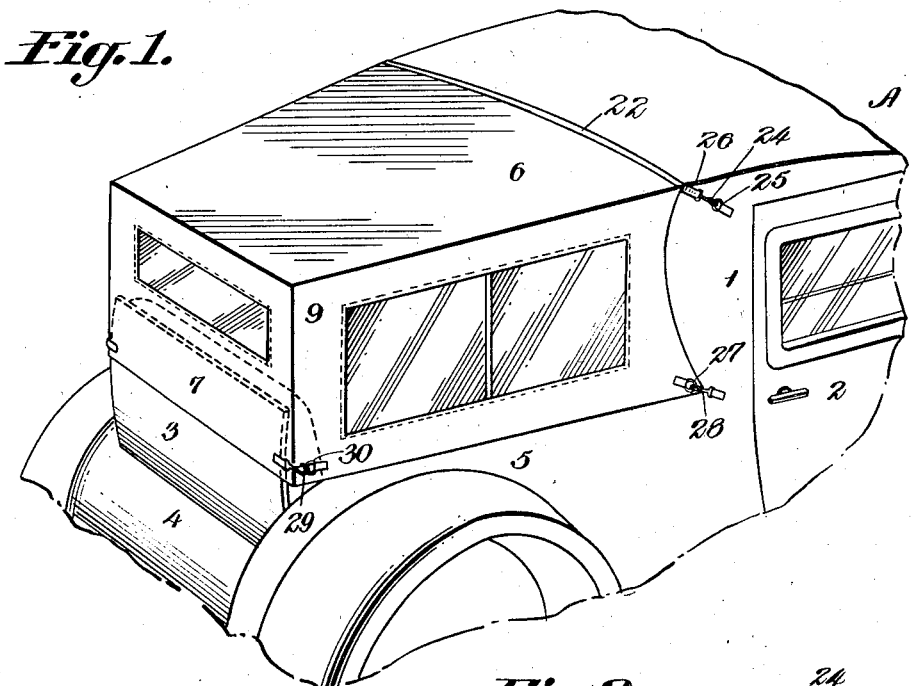
Fig. 1.
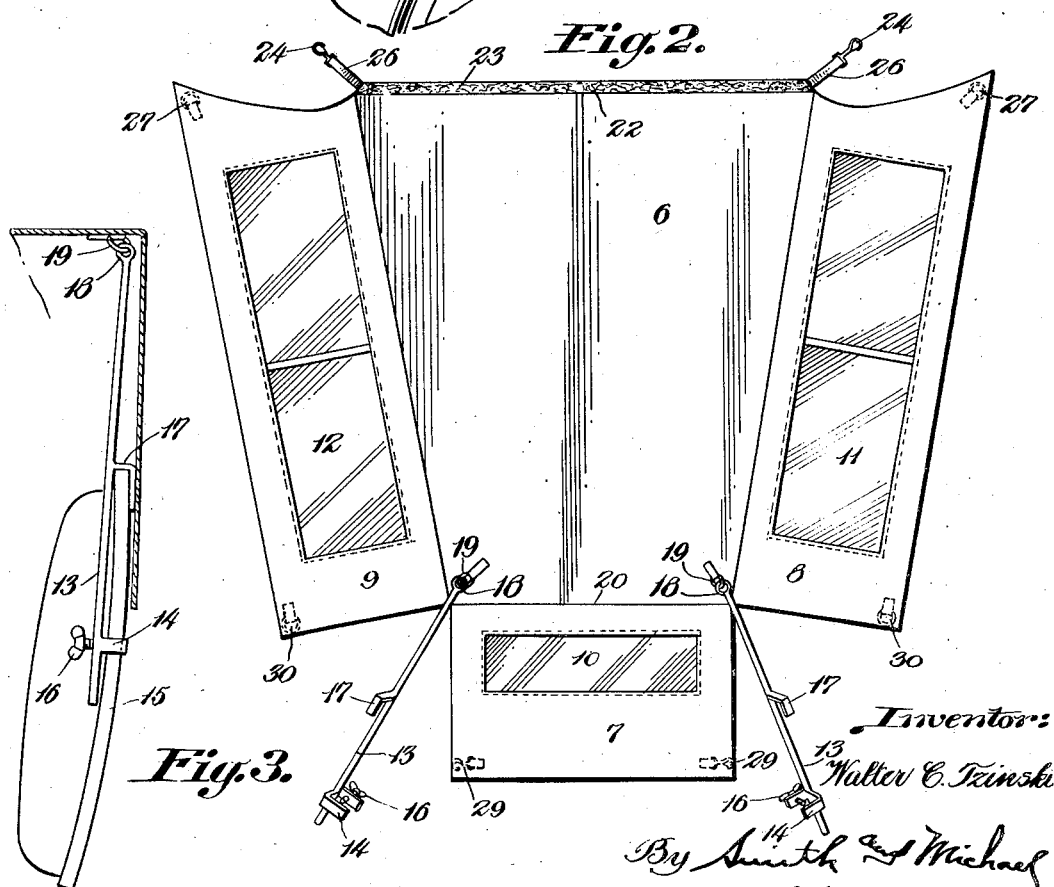
Fig. 2.
Fig. 3.
Inventor:
Walter C. Tzinski
By Smith and Michael
Attorneys.

Patented June 24, 1930

1,767,159

UNITED STATES PATENT OFFICE

WALTER C. TZINSKI, OF BALTIMORE, MARYLAND

SHELTER COVER FOR RUMBLE SEATS

Application filed January 26, 1928. Serial No. 249,711.

This invention relates generally to auxiliary shelters or supplemental tops for motor vehicles, and more particularly to auxiliary shelters designed for use with motor vehicles of the types known as roadsters, coupés and the like.

In recent years it has become more and more the general practice in automobile design and particularly in automobile body design to provide some form of auxiliary seat in roadster and coupé bodies, which seats are for the most part of the foldable or collapsible type and which are mounted in the rear of the main seat of the vehicle. The main seats of such vehicles are provided with a shelter or cover either permanent or collapsible in character which effectively protects the occupants thereof but the auxiliary seats, due to their design and location are necessarily outside of the main vehicle top or cover and exposed to the full force of the elements. Obviously, this is a serious objection in cold or inclement weather.

With these facts in mind, therefore, the present invention seeks to provide an auxiliary shelter or cover for the exposed or so-called rumble seats of roadsters, coupés or the like which may be quickly erected in case of emergency and which, when not in use, may be stored away in the usual tool or luggage compartment of the car.

Another feature of the invention is to provide an auxiliary top or shelter of the character indicated which can be economically manufactured and which at the same time will be convenient, durable, practical and substantially weather-proof.

The invention consists in certain new and improved features of construction and combination of parts fully described in the following specification and illustrated in the accompanying drawings, wherein:

Figure 1 is a perspective view of the rear portion of a vehicle showing my improved top attached thereto.

Fig. 2 is a plan view of my improved top.

Fig. 3 is a fragmental detail sectional view showing the manner of attaching the top to the back of a rumble seat.

Referring more particularly to the accompanying drawings wherein like reference numerals designate like parts throughout, A designates generally the rear portion of a vehicle of the coupé or roadster type provided with the usual enclosed main or forward seat compartment 1 having a side entrance door 2. The body A is shown provided with a rumble seat 3 of conventional design, said seat as is usual in this type of construction, being pivotally associated with the rear portion of the main vehicle body and designed when not in use, to fold forwardly into the usual luggage or tool compartment 5, the back 3 of the seat in this position functioning to close the compartment and to form a substantially smooth and unbroken surface from the rear part 4 of the body to the back or rear wall of the main top 1.

My improved top or shelter is designed to completely enclose the rumble seat 3 and to this end comprises top, back and side sections numbered 6, 7, 8 and 9 respectively. The auxiliary shelter as shown in Fig. 2 is designed so as to be cut from a single blank or sheet of material if convenient, but if desired, the several sections 6, 7, 8, and 9 may be fabricated individually and then assembled and united as shown in Fig. 2.

The shelter is preferably made of some water-proof fabric such as imitation leather, but any suitable material such as canvas, rubberized fabric, leather or the like may be used if desired. The top section 6 of the shelter or cover is dimensioned to extend completely across the main top 1 of the vehicle and to span the space between the back of the rumble seat 3 and said top. The top section 6 is shown tapered or narrowed toward the rear to correspond to the reduced width of the rumble seat. The side and rear sections 7, 8 and 9 extend downwardly from the side and rear edges of the top section 6 as shown in Fig. 1 and are provided with transparent panes 10, 11 and 12 of flexible material such as celluloid, cellophane or the like.

The auxiliary top or shelter is designed to be secured in position on the vehicle by a pair of braces or standards 13—13 arranged for securement to the upstanding back 3 of the rumble seat as clearly shown in Fig. 3. The standards 13 each carry a lower U-shaped clamp 14 designed to embrace a vertical edge 15 of the seat back 3, one jaw of each clamp being provided with a thumb screw 16 by which the standards may be firmly clamped in an upright position to said seat back. The standards 13 are also each provided with one or more hook members 17 positioned with respect to the U-shaped clamps 14 so that they may engage over the upper horizontal edge of the seat back 3 to effectively maintain the standards in a rigid upright position when the thumb screws 16 are tightened, and to prevent skewing of the standards under stresses incident to the travel of the vehicle, wind, etc.

As shown in the drawings, the standards 13 are each provided at their upper extremities with a loop or eye 18 through which is threaded or linked a ring member 19 secured to the top section 6 of the shelter in any convenient manner. By this arrangement, the shelter when not in use may be conveniently rolled with the standards 13 disposed inside thereof and lying substantially parallel the rear edge 20 of the top section. Although I have elected to show the standards 13 as permanently secured to the top section 6, it is to be understood that such standards may, if desired, be detachably associated with the top in any convenient manner without departing from the spirit of my invention.

The front edge 22 of the top section 6 is preferably provided with an inner sealing strip 23 composed of felt or similar material which is maintained in weather-tight contact with the upper surface of the main vehicle top 1 by means of fastening devices 24 carried by the top section 6 at the forward outer corners thereof, said fastening devices being engageable with suitable cooperating members 25 secured to opposite sides of the top 1. The fastening elements 24 and 25 which may be of any convenient form desired are shown as snap hooks and rings, the former being secured to the top section 6 by elastic members 26 designed to maintain the forward edge 22 of the cover taut at all times. Similar fastening elements 27 are secured to the cover at the lower forward corners of the side sections 8 and 9 and these elements cooperate with snap hooks or similar devices 28 conveniently secured to the main top 1. The respectively adjacent lower rear corners of the back and side sections 7, 8 and 9 carry cooperating fastening members 29 and 30 whereby these sections may be maintained closed and in close contact with the sides of the body compartment 5 and the back of the seat 3, it being noted particularly that the rear section 7 of the cover extends below the upper edge of the seat back an appreciable distance to insure a weather-tight joint at this point.

In use, when it is desired to mount the auxiliary top to the vehicle, the standards 13 are first secured to the seat back 3 as shown in Fig. 3 and the top section 6 is then drawn forwardly and made secure to the upper fastener members 25 carried by the main top 1, it being understood that the top section 6 of the cover overlaps the main top 1 of the vehicle a sufficient distance to provide, with the help of the sealing strip 23, a substantially weather-tight joint at this point. The lower fastener members 27 and 28 are then engaged. This leaves the side sections 7 and 8 free to be raised at the rear corners to enable passengers to enter or leave the compartment 5 within which is positioned the seat 3. The fasteners 29 and 30 are then engaged whereupon the seat 3 and its passengers are effectively and completely enclosed. When the auxiliary top is not desired it may be quickly removed in an obvious manner and the standards 13 disposed within the top and transversely thereof, the side and back sections being folded within the outlines of the top section and the whole cover or shelter then made into a compact roll which may be conveniently stored away in the luggage compartment 5.

It is apparent, therefore that I have designed an auxiliary top or shelter for the exposed or rumble seats of motor vehicles which may be economically manufactured and which can be quickly and easily attached to or removed from a vehicle of standard construction, said shelter when in place on the vehicle forming a convenient practical and substantial protection to the occupants of the otherwise exposed seats. It is to be understood, however, that while I have here elected to show and describe a preferred embodiment of my invention, such description has been for the purpose of example only and the right is expressly reserved to make such variations in parts and details of construction as fairly fall within the scope of the appended claims wherein I have pointed out more particularly what I consider to be the novel features of my invention.

Having thus described the invention, what I claim as new is:

1. An auxiliary shelter for rumble seats comprising a flexible cover, supporting standards connected to the cover near the rear corners thereof, means for connecting said standards to a vehicle body for supporting the cover over an exposed seat of the vehicle, said standards forming the sole supporting means for the rear portion of the cover, said standards including securing elements adapted to engage the vehicle body at a plurality of points whereby to maintain the standards substantially vertical and to maintain the flexible cover taut between the standards.

2. An auxiliary shelter for rumble seats comprising a flexible cover, supporting standards connected to the cover near the rear corners thereof, means for connecting said standards to a vehicle body for supporting the cover over an exposed seat of the vehicle, said standards forming the sole supporting means for the rear portion of the cover, said standards being pivotally attached to the cover and movable to a position within the same whereby to form a core or mandrel on which the shelter may be rolled when not in use.

3. An auxiliary shelter for rumble seats comprising a flexible cover, a supporting standard connected to the cover near each rear corner thereof, said standards forming the sole supporting means for the rear portion of the cover, and means for connecting said standards to a vehicle body for supporting the cover of an exposed seat of the vehicle, said means including a clamp adapted to engage a vertical edge of the seat back and a hook adapted to engage a horizontal edge of the seat back whereby to maintain the standards in a substantially vertical position and to maintain the flexible cover taut between the standards.

In testimony whereof I hereunto affix my signature.

WALTER C. TZINSKI.